United States Patent
Foust

(10) Patent No.: US 6,240,369 B1
(45) Date of Patent: May 29, 2001

(54) TRANSMITTING LOCATION-SPECIFIC WEATHER-RELATED DATA TO TERMINALS WITHIN A PLURALITY OF REGIONS

(76) Inventor: Robert R. Foust, 14731 68 Dr. No., Palm Beach Gardens, FL (US) 33418

( * ) Notice: Subject to any disclaimer, the term of this patent is extended or adjusted under 35 U.S.C. 154(b) by 0 days.

(21) Appl. No.: 09/300,571

(22) Filed: Apr. 27, 1999

(51) Int. Cl.[7] ....................................................... G01W 1/00
(52) U.S. Cl. ................................................. 702/3; 342/26
(58) Field of Search ................................. 702/3; 395/211; 455/12; 342/26

(56) References Cited

U.S. PATENT DOCUMENTS 5,654,886 * 8/1997 Zereski, Jr. et al. ..................... 702/3
5,727,057 * 3/1998 Emery et al. ........................ 379/211
5,826,165 * 10/1998 Echeita et al. ........................... 455/2

* cited by examiner

Primary Examiner—Christine Oda
Assistant Examiner—Victor J. Taylor
(74) Attorney, Agent, or Firm—Norman Friedland

(57) ABSTRACT

A system for distributing weather information accepts differing types of such information for storage in a number of databases. Data representing levels of precipitation are stored in an overall database, to be overwritten as new data becomes available. Data representing storm warnings and lightening strikes are stored in a time-sensitive database, to be erased according to a predetermined schedule. Data representing a satellite photograph of cloud cover are stored in a cloud map database. These databases are read to obtain data which is transmitted to terminals within various regions, so that each terminal receives weather information for an area surrounding its region.

27 Claims, 7 Drawing Sheets

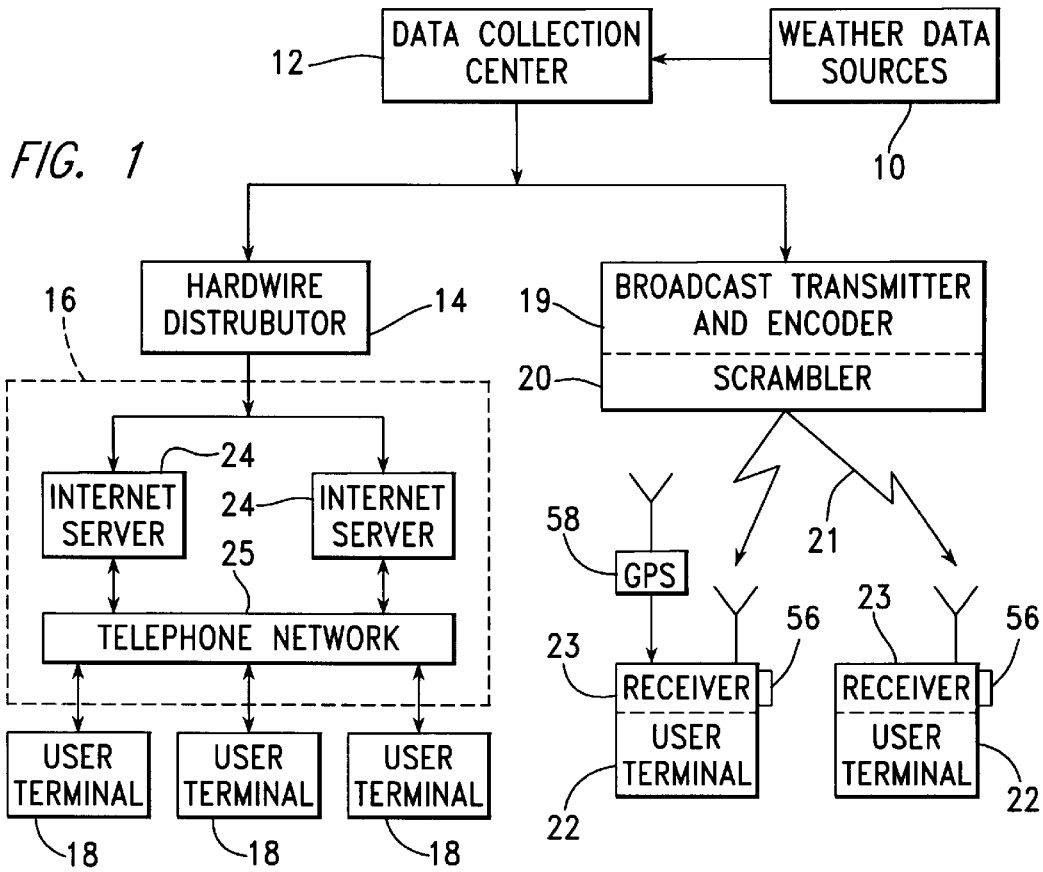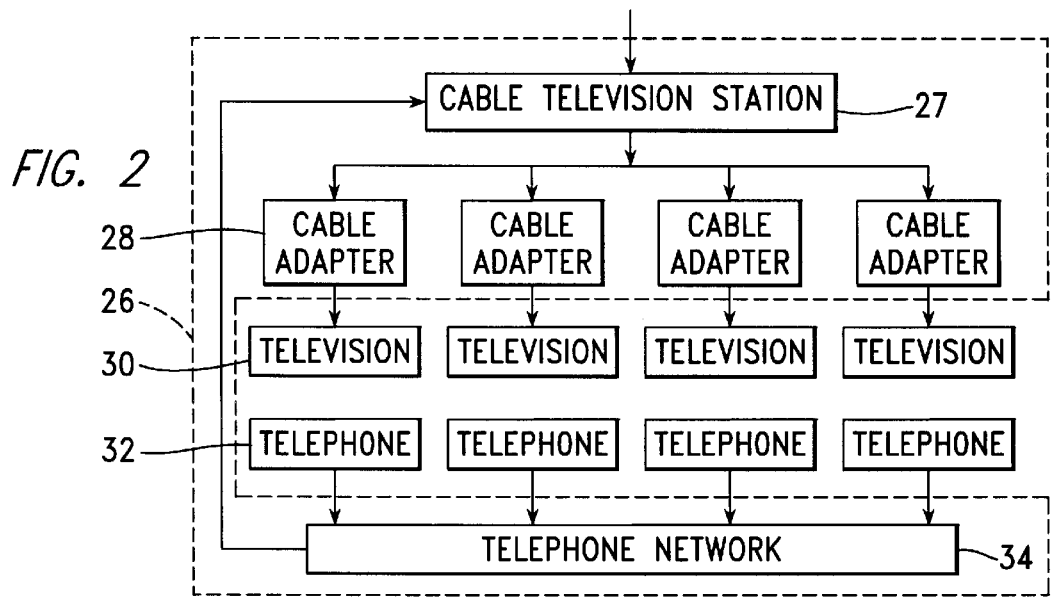

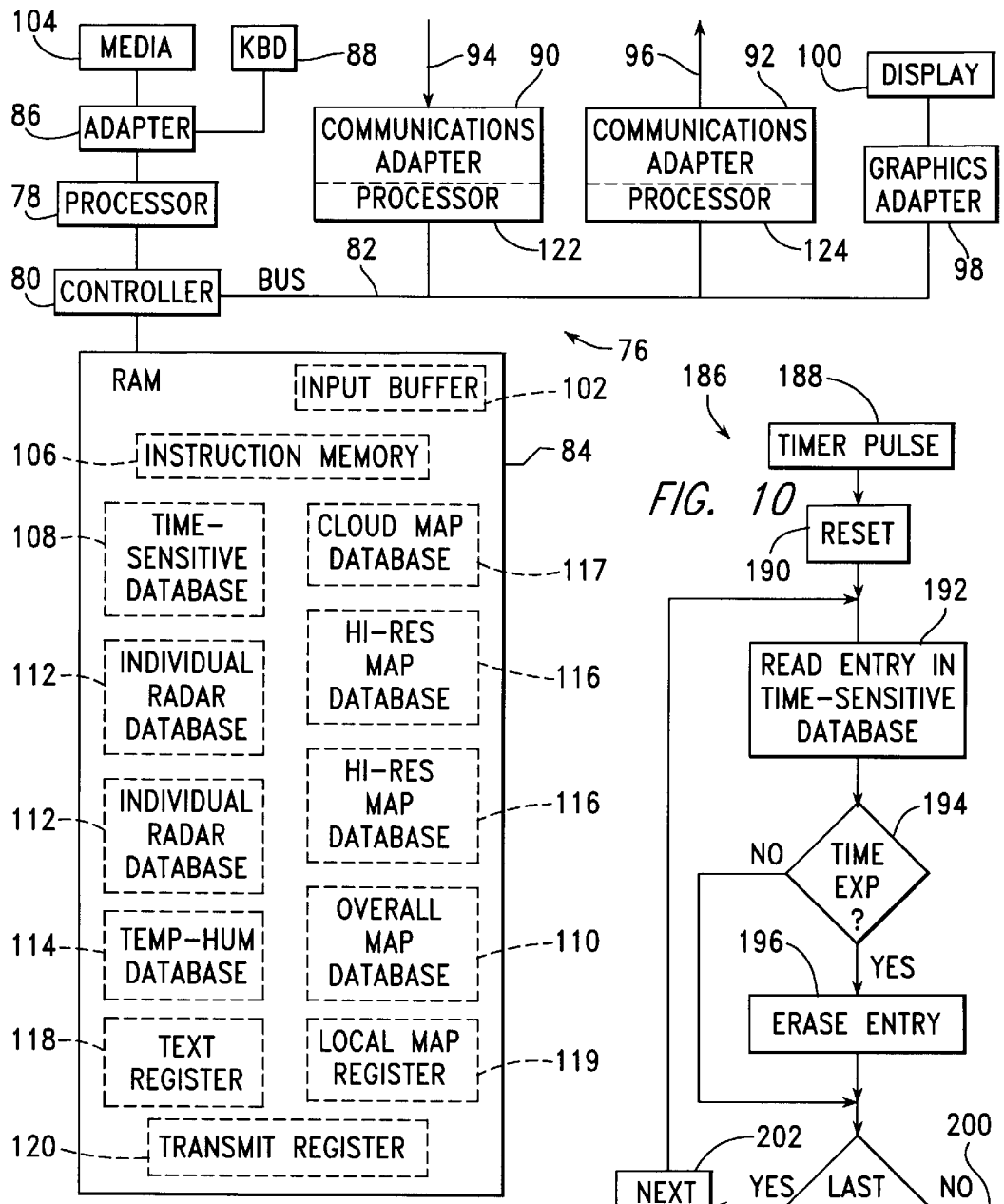

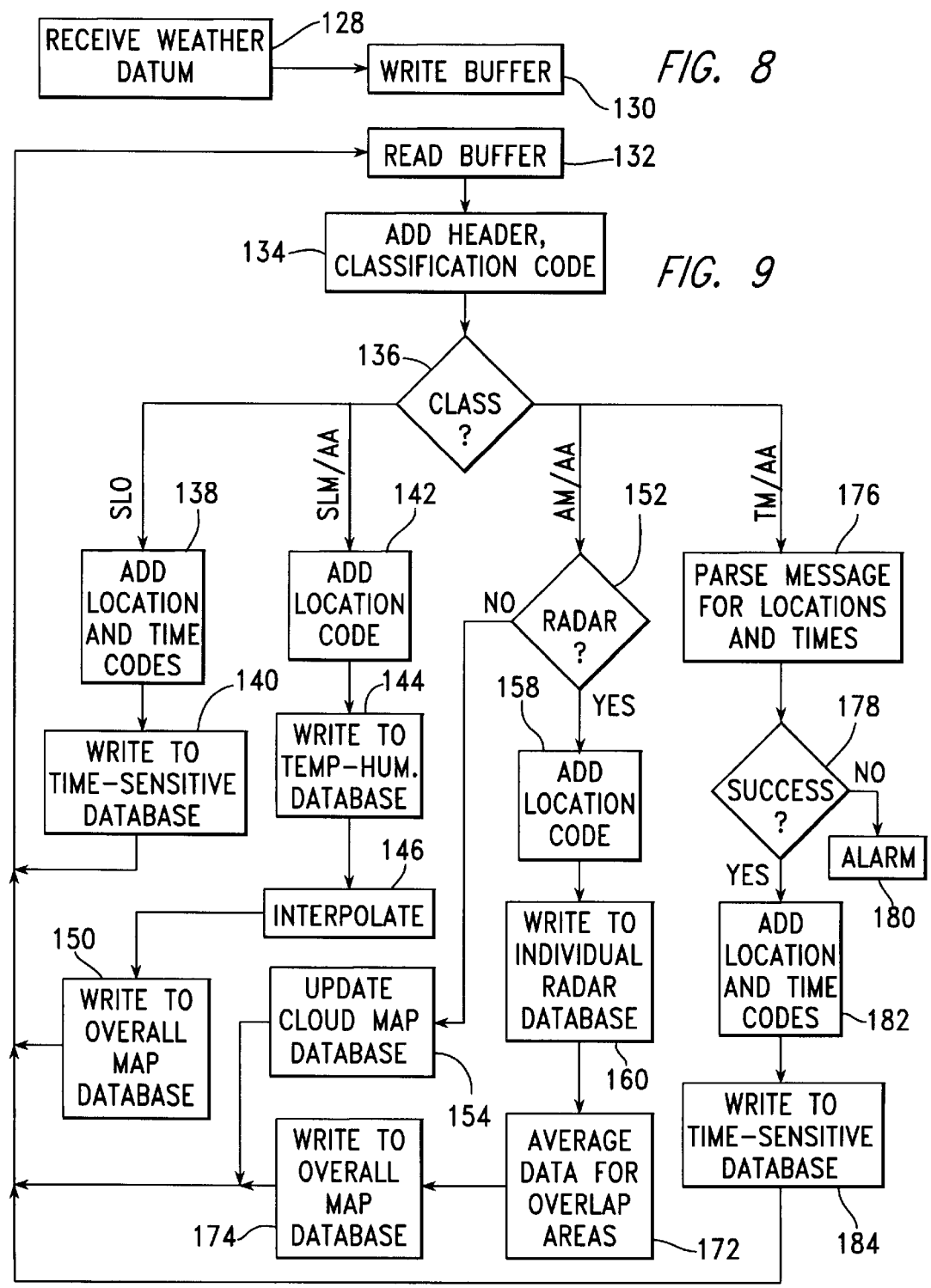

TRANSMITTING LOCATION-SPECIFIC WEATHER-RELATED DATA TO TERMINALS WITHIN A PLURALITY OF REGIONS

BACKGROUND OF THE INVENTION

1. Field of the Invention

This invention relates to the distribution of weather-related data to a number of terminals, and, more specifically, to delivering data related to specific regions to terminals within these specific regions.

2. Background Information

Although accurate weather information is always being generated by a number of sources, existing methods for distributing such information limits its usefulness to many individuals and organizations. Commercial and governmental interests whose operations may be severely affected by changes in the weather, such as airports, individual aircraft, and maritime interests, use sophisticated equipment to view weather information generated at their locations. The most common type of this equipment is radar, which is now present in the nose cones of airliners as well as at airport sites.

On the other hand, most other individuals and organizations do not have access to sophisticated equipment for weather observation. What is needed is a means to provide personalized weather information for an individual user by enhancing and transposing currently generated weather information, including information from weather radar, so that such information appears as it would if it were generated at or near the location of the user.

Since weather observations generated from radar data have been available to television viewers for years, many people are thoroughly familiar with the format of such observations, including the use of various colors to indicate local weather severity caused, for example, by storm cells. However, a typical television weather broadcast must cover such a wide area, which is generally essentially coincident with the viewing area of the television station, that the data display usually cannot adequately present localized conditions. Localized conditions are presented at most during limited time periods and when extremely severe conditions occur. Even such reports may not be understood by travelers who are not familiar with the landmarks referenced in a weather data presentation.

Furthermore, weather broadcasts from local television stations are typically only presented several times a day. At least one cable network station presents weather data continuously, but this data is presented on a national basis, with only a fraction of the time being given to local weather. In either case, the benefit of local information is achieved only for viewers watching the television station when such data is presented.

Thus, what is needed is a means for obtaining weather data at any time chosen by the user of a weather station, with such data being formatted in a manner including the familiar radar format for a localized area surrounding the user or chosen by him, preferably including the familiar radar format, whether the user is in a fixed location or mobile within a vehicle.

3. Description of the Prior Art

U.S. Pat. No. 5,568,385 to Shelton describes a computer-based system for collecting and displaying weather information, which includes a microprocessor-based computer programmed to receive digital signals encoding weather data collected at each of a number of weather stations, and to store and retrieve those digital signals in predetermined screen buffers to generate weather data screens displaying alphanumeric and graphic displays of the data. The system includes multiple weather stations, each of which includes one or more weather instruments capable of sensing a particular weather parameter. Remote weather stations are connected to the computer by conventional modem/telephone hookups. Display screen data output from the computer is converted to a television broadcast quality signal, so that the data screens may be broadcast or otherwise delivered to television viewers through conventional television delivery systems.

U.S. Pat. No. 5,265,024 to Crabill et al. describes a system for providing systematic updated weather information from the ground to the pilot of an aircraft. A ground station receives and assimilates weather data for satellite broadcast as digital weather data, which is received by an aircraft, while on the ground or while airborne. This data is encoded by a flight processor within the aircraft and shown on a display screen to the pilot in map-type depictions and alpha-numeric format tailored to his operational needs. The display screen information is controlled by a control panel that permits the pilot to select the departure, destination, alternate, and any arbitrary airport. Such a selection establishes the map boundaries, with the projected flight path being marked on the displayed map.

U.S. Pat. No. 5,565,909 to Thibadeau et al. describes a system in which location-specific messages or programming are generally broadcast to be selectively filtered by user terminals which have encoded one or more arbitrary locations of interest. The area surrounding a user, a remote location, a route to be traveled, or the like may be selected for receipt of local warnings, local commercial messages, and the like. The messages are received by a set-top receiver, which is preferably a tunable apparatus capable of receiving digital information transmitted by a variety of means. Transmitted messages contain information targeted to geographical groups of users, with location-designation coding accompanying location-specific messages. A geographic location selection code is entered into a data processor coupled to the user's receiver to define the user's selected location(s) of interest. The user's selection code is variable, and plural locations can be used and prioritized. Preferably, regions are encoded by their boundaries, e.g. in longitude, latitude, altitude, or the like, and in absolute or relative coordinates, with shorthand designations referring to stored definitions of areas. Filtering segments based on message content, prioritizing the messages and additional features, can be included.

U.S. Pat. No. 5,654,886 to Zerzski, Jr. et al. describes a system providing multimedia presentations of outdoor information, such as weather information and ski reports, on information transmission networks, such as the Internet, on-line services, and interactive TV. The outdoor information is compiled from a plurality of sources by transmitting it to a presentation generator, in which it is converted into presentation information for generating multimedia presentations. The presentation information is stored in a computer database that is accessible through the network. A multimedia presentation, which is generated at the user device, may include a graphic display of a meteorologist's weather forecast and an audio reproduction of the meteorologist's oral weather forecast.

U.S. Pat. No. 5,528,248 to Steiner, et al. describes apparatus for displaying a geographical location, determined with a GPS antenna, as an icon on a map.

A number of U.S. patents describe systems for transmitting information, other than weather information, to various display devices in accordance with the location of the display device.

A first example of such a system is found in U.S. Pat. No. 5,678,194 to Grube et al., which describes a system in which geographic-dependent information may be automatically transmitted to communication units by a communications resource controller, which, upon receiving location coordinates, accesses a data base to determine localized geographic dependent information. Having retrieved this information, the communication resource controller transmits this information to communication units. Upon receipt of this information the communication units determine whether it is pertinent to them. It the information is pertinent, the communication units display the information. The geographic-dependent information is described, for example, as telling a police officer with a communication unit what areas in his vicinity need to be checked.

A second example of such a system is found in U.S. Pat. No. 5,528,248 to Steiner et al., which describes apparatus for displaying a geographical location as an icon on a map. The apparatus includes a GPS antenna for determining the geographical location, a personal computing system including a display, a processing system including a standard software operating system, and a map application program capable of running the operating system.

A third example of such a system is found in U.S. Pat. No. 5,717,392 to Eldridge, which describes a position-responsive information presentation system and control, which automatically provide multimedia output that is responsive to a user's location, speed, acceleration, and directional orientation. The system may receive position information from various systems, including a satellite global positioning system (GPS), or it may use pre-established external triggers located at sites where information is to be presented. The system may provide information on local history and geography, available local services, etc.

Other U.S. patents describe systems for creating displays of geographical and weather data. An example of such a system is found in the weather visualization system of U.S. Pat. No. 5,379,215 to Kruhoeffer et al., which retrieves a static terrain map to be merged with dynamic weather information, generating, for example, a sequence of images to provide "fly-by" animation. Another example of such a system is the weathercasting system of U.S. Pat. No. 5,583,972 to Miller, for displaying dynamic, real-time, photo-realistic, three-dimensional pictorial representations of weather conditions created from meteorological data combined with geographic and topographical data.

SUMMARY OF THE INVENTION

In accordance with a first aspect of the present invention, there is provided a method for transmitting location-specific weather-related data to terminals within a plurality of terminal regions, in which the method comprises steps of:

a) receiving input weather information;

b) storing the input weather information in a buffer;

c) storing the input weather information in a database, in which each portion of the weather information is addressable according to a geographical location associated with the portion of the weather information;

d) reading from the database each portion of the weather information associated with a geographical location within an area of interest surrounding a terminal region and associated with the terminal region;

e) transmitting each the portion of the weather information associated with a geographical location within an area of interest surrounding a terminal region and associated with the terminal region to terminals within the terminal region; and f) repeating steps d) and e) for another terminal region within the plurality of terminal regions until a portion of the weather information has been transmitted to each terminal region within the plurality of terminal regions.

In accordance with a second version of the present invention, there is provided a method for transmitting location-specific weather-related data to terminals within a plurality of terminal regions, in which the method comprises steps of:

a) receiving the input weather information;

b) storing the input weather information in a buffer;

c) determining whether the input weather information is in a first or second class, in which input weather information in the first class is stored to be overwritten by subsequent weather information, and in which weather information in the second class is stored to be erased at a specified time;

d) storing the input weather information in the first class in an overall database, in which each portion of the input weather information in the first class is addressable according to a geographical location associated with the portion of the weather information;

e) storing the input weather information in the second class in a time-sensitive database, in which each portion of the weather information in the second class is addressable according to a geographical location associated with the portion of the weather information, and in which each portion of the weather information in the second class is stored with an indication of a time when the weather information is to be erased;

f) for weather information stored in the time-sensitive database, checking the indication of the time when the weather information is to be erased, and erasing the weather information if the time has past, g) reading from the overall database each portion of the weather information of the first class associated with a geographical location within an area of interest surrounding a terminal region and associated with the terminal region;

h) reading from the time-sensitive database each portion of the weather information of the second class associated with a geographical location within an area of interest surrounding the terminal region and associated with the terminal region;

i) formatting weather information read in steps g) and h) to superimpose information read in step h) over information read in step g)

j) transmitting weather information formatted in step i) to terminals within the terminal region; and k) repeating steps g) through j) for another terminal region within the plurality of terminal regions until portion of the weather information have been transmitted to each terminal region within the plurality of terminal regions.

BRIEF DESCRIPTION OF THE DRAWINGS

FIG. 1 is a schematic view of a system for generating and distributing weather information, built in accordance with the present invention;

FIG. 2 is a schematic view of a first alternative hardwired network which is used in place of the hardwired network of FIG. 1;

FIG. 7 is a block diagram of a computing system within a data collection center of FIG. 1;

FIG. 8 is a flow chart of processes used to store weather data in an input buffer within the computing system of FIG. 7;

FIG. 9 is a flow chart of processes occurring to convert data stored in the processes of FIG. 8 into the contents of several databases;

FIG. 10 is a flow chart of processes occurring to erase data stored within a time-sensitive database during the processes of FIG. 9 when such data is no longer appropriately placed in data packets for transmission;

DETAILED DESCRIPTION

Figure 3:
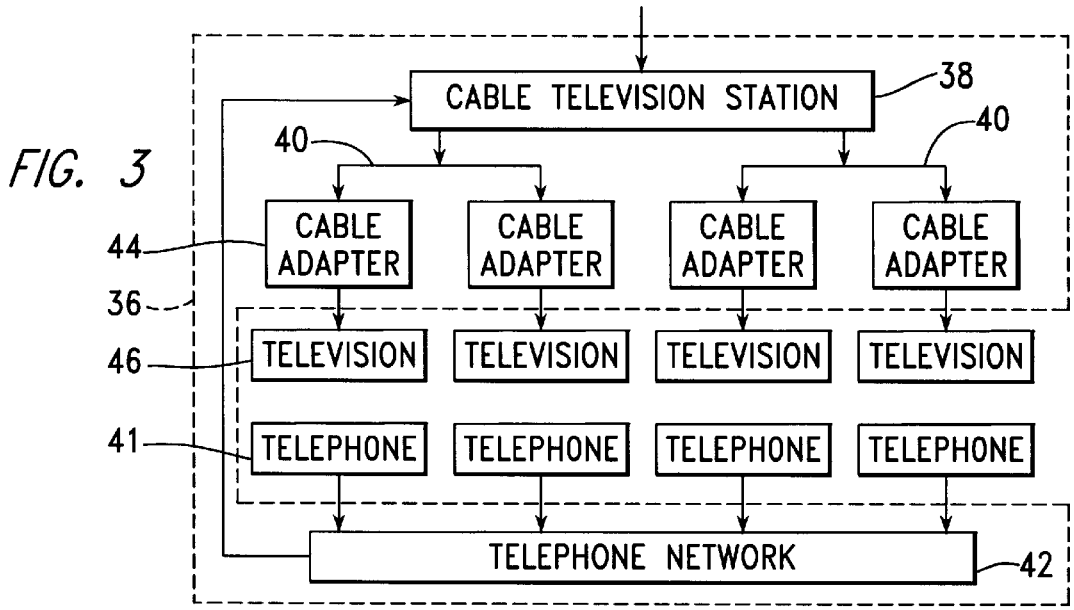
FIG. 3 is a schematic view of a second alternative hardwired network which is used in place of the hardwired network of FIG. 1.

FIG. 1 is a schematic diagram providing an overview of a system for generating and distributing personalized weather information in accordance with the present invention. In this system, data from one or more weather information sources 10 is assembled in a data collection center 12. Data from the data collection center 12 is provided as an input to a hardwire distributer 14, where it is reformatted for transmission through a hardwired network 16 to a number of system user terminals 18. Data from the data collection center 12 is also provided as an input to a broadcast transmitter and encoder 19, which may include an optional scrambler 20. In the broadcast transmitter and encoder 19, the data from the data collection center 12 is reformatted for broadcast transmission. Data from the broadcast transmitter and encoder 19 is transmitted through a broadcast network 21 to a number of system user terminals 22. The broadcast transmitter and encoder 22 provides for simultaneous transmission of a number of data streams, each containing data corresponding to an area in which one or more system user terminals 22 may be located. Each system user terminal 22 has a specialized receiving device 23 discriminating among the various signals provided through the broadcast network 21, so that only the signal corresponding to the location of the user terminal 22, or another location chosen by the user terminal, is displayed through the user terminal 22.

The data collection center 12, which is operated by a data provider, includes a computing system in which available weather information is gathered, localized conditions of interest are selected, and the information is formatted for transmission to user terminals in various locations. The data provider may be the National Weather Service, a television station, a satellite television signal provider, or any other organization desiring to provide a personal weather service. Since the primary source of data for this weather service is weather radar, the data provider must have access to weather radar data, along with other data describing, for example, wind and surface conditions.

In the example of FIG. 1, the hardwired network 16 is the Internet, through which two-way communications are routinely provided over the public switched telephone network. Such a system permits the selection of specific information by the user, with the information being selected for his particular location. With this network, a user having Internet access can be provided with a personalized weather service without a need to purchase any additional equipment. The signals from the hardware distributer 14 are provided to a number of Internet servers 24, which are in turn connected to the user terminals 18 through the public switched telephone network 25. Two way communications are established in the conventional manner between a user terminal 18, which is, for example, a personal computer having a modem connected to the telephone network 25 and an Internet server 24. After a connection is established, the user selects the area for which he is wants to receive weather information by means of his computer keyboard or pointing device. A routine executing within the user terminal 18 may provide the location of the user, so that the correct weather information for his area is sent without further human intervention, with the computer keyboard or pointing device still being available to select another area from which he is interested in receiving weather data.

FIG. 2 is a first alternative example of a hardwired network 26, which may be used in place of the hardwired network 16 of FIG. 1. In this hardwired network 26, a cable television system is used to distribute the weather information, with the output of the hardware distributer 14 of FIG. 1 being provided as an input to a cable television station 27. In this hardwired network 26, each of the localized weather signals from the hardwire distributer 12 is provided as an input to the cable television station 27, which in turn provides each of these signals as an output to each cable adapter 28 attached to a user's television set 30.

A service now available from most cable television systems is "pay per view" programming, through which the user selects individual programming. This is typically done by using a telephone 32 to order a program available at a particular time on a particular channel. Thus, communication from the user to the cable television system is over the public switched telephone network 34, while communication from the cable television system to the user is over the television cable to a cable adapter 28 which is conditioned to enable the reception of the pay-per-view program. While the details of this type of communication may vary from one cable television system to another, this service is widely available and well known. This type of communication may be used to distribute weather information developed in accordance with the present invention, with various cable channels communicating weather information developed for specific areas within the region served by the cable television system, and with the cable adapter 28 being conditioned to enable the reception of a particular such channel in response to a telephone call placed by the user.

The hardwired network of FIG. 2 may alternately be used without the telephone network 34, with the channel selector of the cable adapter 28 being used to discriminate among all of the programming, including the various weather channels available from the cable television station 26. Alternately, the system may be used without the cable adapters 28, with the channel selector on each television set 30 being used to discriminate among all programming, including the weather channels.

FIG. 3 is a second alternative example of a hardwired network 36 which may be used in place of the hardwired network 16 of FIG. 1. In the example of FIG. 3, to conserve the number of cable television channels used to present this weather information, the network of a cable television system is divided into several sectors 40, with only those channels providing information developed for areas within a particular sector 40 being distributed within the sector 40. Otherwise, the operation of the second alternative network 36 is as that described above in reference to the first alternative network 24 of FIG. 2, with individual users selecting localized weather data channels either by means of a telephone 41 through the telephone network 42, by means of a channel selector on the cable adapter 44, or by means of a channel selector on a television set 46.

Figure 4:
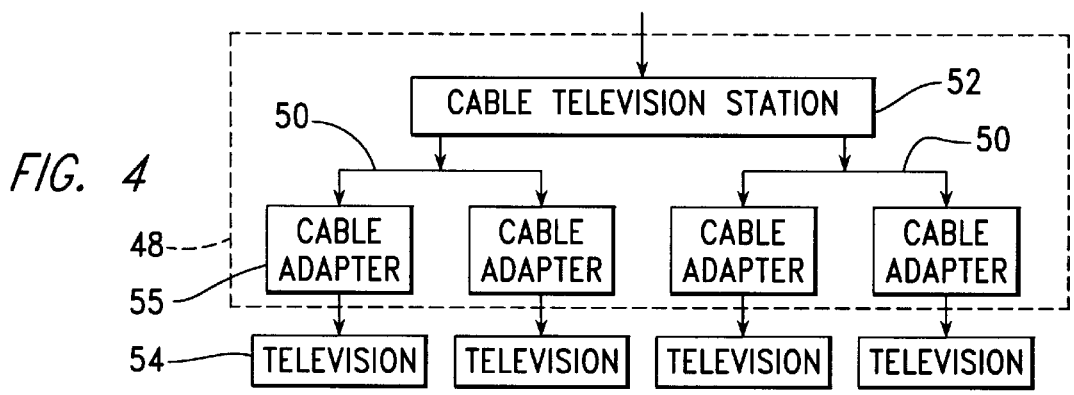
FIG. 4 is a schematic view of a third alternative hardwired network which is used in place of the hardwired network of FIG. 1.

FIG. 4 is a third alternative example of a hardwired network 48 which may be used in place of the hardwired network 16 of FIG. 1. In the example of FIG. 3, each sector 50 of the television cable system extending from the cable television station 52 carries only a single channel of weather information, which is applicable to the locations of those television sets 54 connected to the particular sector 50. In this example, the localized weather is selected by the user, along with the various other television stations, by using the channel selector of his cable adapter 55, or by using the channel selector of his television set 54 if no cable adapter 55 is installed. In this example, there is no need to communicate over the telephone system, and all information flows downward, from the hardware distributer 14 of FIG. 1, through the hardwire network 48, to the television sets 54.

One advantage of using a hardwired network 16, 24, 36, 48 is that the location of the user is generally known, so that weather information generated for his location can be readily sent to him. This location can be either a relatively large range, such as a particular part of a city, or a much smaller range, such as an individual building or block. The use of small ranges is not needed for all users and requires additional effort on the part of the provider to generate more data streams within the data collection center 12 and to distribute weather data through more complex networks. As described above, the use of larger ranges is particularly desirable to limit a need for additional channels when a cable television system is used for the distribution of weather information.

Referring again to FIG. 1, in a preferred version of the current invention, the ranges are large enough to prevent a need for additional, specialized equipment at the terminal of the user. In the example of FIG. 1, the data collection center 12 provides data to both the hardwire distributer 14 and the broadcast transmitter and encoder 19. The broadcast network 21, through which information is broadcast from the broadcast transmitter and encoder 12, is considered to include any type of transmission in which a device having an antenna is used to receive signals through the air. Such communication may include direct radio or television transmission or transmission from a satellite through a satellite provider. There is no communication within the broadcast network from the user terminal to the broadcast transmitter and encoder 19. All of the broadcast signals from the transmitter 19 are always available throughout the range of the transmitter 19, with the receiver 23 determining which of these available signals is displayed by the user terminal 22.

In a stationary receiver 23, the selection of a channel or data stream is preferably achieved through a selection switch 56, which allows the user to select either weather data for his own location or for another location. This feature is useful in planning a trip, in determining how relatives are faring during a storm, and so on. In the example of transmission through a satellite provider, where many channels are typically available, the channel selection mechanism of the satellite transmission receiver may be used to select among a number of channels, each of which has weather information for a different location.

In a mobile receiver 23, which is used, for example, in a vehicle, a selection switch 56 may be used in the same way, so that the user can select data for his own location or for another location. Additionally, location data determined through the use of a GPS (Global Positioning Satellite) navigation unit 58 can be used to select data for the actual location of the user terminal 22, with the process of determining what data to display being updated continually in an automatic manner.

While the example of FIG. 1 shows a single data collection center 12 providing information to both a hardwire distributer 14 for distribution over a hardwire network 16 and a broadcast transmitter and encoder 19 for broadcast over a broadcast network 21, it is understood that the present invention includes a system distributing information over only a hardware network 16 or only a broadcast network 21.

Figure 5:
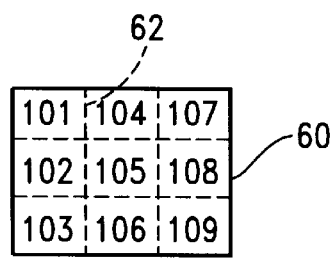
FIG. 5 is a pictorial plan view of a region within an area covered by weather data from the system of FIG. 1, showing a method for identifying subregions therein.

FIG. 5 is a pictorial plan view of a region 60 within an area covered by weather data supplied from the system of FIG. 1. In accordance with a preferred version of the present invention, the region 60 is divided into nine sub-regions 62. Depending on weather conditions and choices to be made, user-terminals within each of these nine sub-regions 62 may receive different weather information, or user terminals within these subregions 62 may receive the same weather information. In the example of FIG. 5, the first two digits of a location code, such as 10, are used to identify the region 60, while the last digit identifies the sub-region 62 within the region 60. The number of digits in the location code is readily varied to change the number of regions and sub-regions which can be uniquely addressed.

Figure 6:
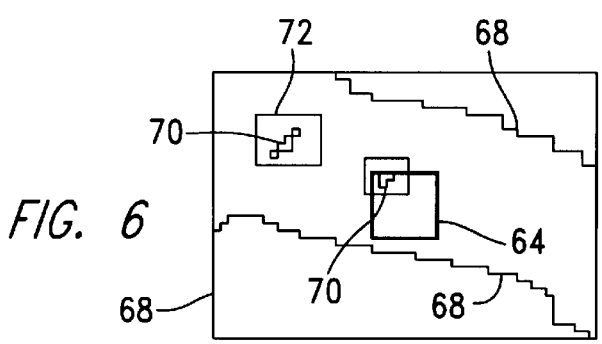
FIG. 6 is a pictorial plan view of a terminal region of a user terminal within a surrounding associated area of interest covered by weather data from the system of FIG. 1.

FIG. 6 is a pictorial plan view of a terminal region 64 and an associated region of interest 66. Within the terminal region 64, a number of user terminals 18, 22 (shown in FIG. 1) for receiving weather data are located. In accordance with a preferred version of the present invention, data is provided for each user terminal within the region 64, with the data being associated with weather events occurring within a region of interest 66, which surrounds the terminal region 64, and which is preferably rectangular in shape to be readily presented on a computer monitor or television screen. The terminal region 64 is preferably centered within the area of interest, so that each user to a terminal within the terminal region 64 sees a weather picture having his location approximately centered. A weather picture showing the area of interest 66 shows the patterns, indicated by lines 68, forming boundaries of precipitation, as developed from the output of one or more weather radar stations, and areas of severe weather 70, also developed from the output of one or more weather radar stations. When one or more such areas 70 is present within the area of interest 66, it is included within a high-resolution image 72. In the example of FIG. 6, the user operating a terminal within the region 64 is shown an image of the entire area of interest 66, and an image of each of the areas 70 including severe weather, with these areas being magnified to a higher resolution, so that they fill the portion of a television or display screen set aside for such images.

The operation of the weather distribution system in accordance with the present invention will now be discussed, with reference again to FIG. 1. The weather data sources 10 are chosen to produce weather information that covers relatively large area, being nevertheless geographically relatable within the area covered by the weather distribution system. A key portion of the weather data is derived from one or more weather radar installations. This radar data is used primarily for determining where various types of precipitation are occurring, and for determining the severity of local precipitation. Other types of weather data, measured with various other types of weather instrumentation, such as measurements of lightening strikes detected by ground sensors, satellite photographs of cloud cover, levels of temperature and humidity, and wind velocities measured at specific locations, and water temperature and sea conditions measured in coastal areas, are preferably also included. This weather data may further include textual data generated by weather services, such as weather forecasts and weather warnings. Of this data, precipitation patterns determined from radar data and lightning strikes detected by ground sensors are most closely tied to specific locations.

FIG. 7 is a block diagram of a computing system 76 operating within the data collection center 12 (shown in FIG. 1). This computing system 76 includes a processor 78 and an associated controller 80, which controls processes occurring on a bus 82, which is, for example, a PCI (Peripheral Component Interconnect) bus, and random access memory 84. The computing system 76 also includes a media adapter 86, such as a disk adapter, and a keyboard 88 for providing inputs to the system 78. A first communications adapter 90 and a second communications adapter 92 are attached to the bus 82, with a communications line 94 attached to the first communications adapter 90 for providing input weather messages, and with a communications line 96 attached to the second communications adapter 92 for transmitting output weather messages. A graphics adapter 98, also attached to the bus 82, drives a display device 100 providing a visual display of the system operations.

Various portions of the random access memory 84 of the computing system 76 are set aside for specific purposes. An instruction memory 102 holds instructions for a program executing within the processor 78. These instructions are fed into the computing system 76 from one or more computer readable media 104 inserted into the media adapter 86. The random access memory 84 also includes an input buffer 106, which holds weather data supplied as discrete messages through communications adapter 90.

The two principle databases, for storing weather information concerning the overall area served by the computing system 76, are the time-sensitive database 108 and the overall map database 110. The time-sensitive database 108 holds location information on lightening strikes and textual warning information received, for example, from the National Weather Service. Information of this kind is generally written only once, and must be checked against time data to determine when it should be erased. The overall map database 110 includes information, such as the local density reported by weather radar, indicating precipitation, and temperature measurements, which is subsequently overwritten by new reports from weather radar, and by new temperature and humidity reports, as such reports arrive.

In general, the overall area served by the computing system 76 may be at least partially covered by more than one weather radar installation. Thus, data from each such weather radar installation is written to an associated individual radar database 112; there are as many databases 112 as there are radar stations reporting data to the computing system 76. Where the coverage areas of such radar stations overlap, their output density values are averaged, so that average density values are stored in the overall map database 110. This method allows the updating of information for the overlapping areas as new information becomes available even when the various weather radar installations do not report information simultaneously.

There are typically a number of instrument stations reporting temperature and humidity readings, so all such readings are stored in a temperature and humidity database 114. These readings are overwritten when new readings become available, with new averages being calculated for storage within the overall map database 110 each time a reading is changed.

According to a preferred version of the present invention, a high-resolution map is produced whenever severe weather is included within the overall area served by the computer system 76. Severe weather includes very high levels of precipitation, as indicated by weather radar data, and lightening strikes. As shown in FIG. 6, if multiple high-resolution maps are produced if there is more than one area of severe weather. When severe weather occurs, one or more high-resolution maps showing the occurrence are shown in alternation with one another and in alternation with the normal resolution local weather map, for each user terminal having an area of interest including the locations of the severe weather. Thus, enough high-resolution map databases 116 are available to meet this requirement.

Occasionally, a satellite photograph showing cloud cover within a large region is made available. Digital data from such a photograph is stored within a cloud map database 117, and is overwritten when data from a new such photograph is written into the database 117. Because of the nature of this data, and because such a photograph is usually best interpreted when it is viewed as a whole, the entire photograph is preferably presented to each user terminal served by the computing system 76.

The random access memory 84 further includes a text register 118, in which text messages to be sent as part of an individual transmission are assembled and a local map register 119 in which formatted local map data to be sent as part of an individual transmission is assembled.

The random access memory 84 also includes a transmit buffer 120, in which packets of information are assembled for transmission from the computer 76. After awaiting the completion of this assembly process, a packet is transmitted, either as soon as the process is complete or upon the occurrence of a timing pulse.

Either or both of the communications adapters 90, 92 may have an associated processor 122, 124, with the processor 122 associated with the first communications adapter 90 sharing access to the input buffer 106 with the main processor 78, and with the processor 124 associated with the second communications adapter 92 sharing access to the transmit register 120 with the main processor 78. Otherwise, an I/O interrupt may be used to interrupt a subroutine running when a block of data needs to be loaded into the input buffer 106, and data packets may be transmitted as they are completed, before beginning the processing of data for the next data packet.

Figure 11:
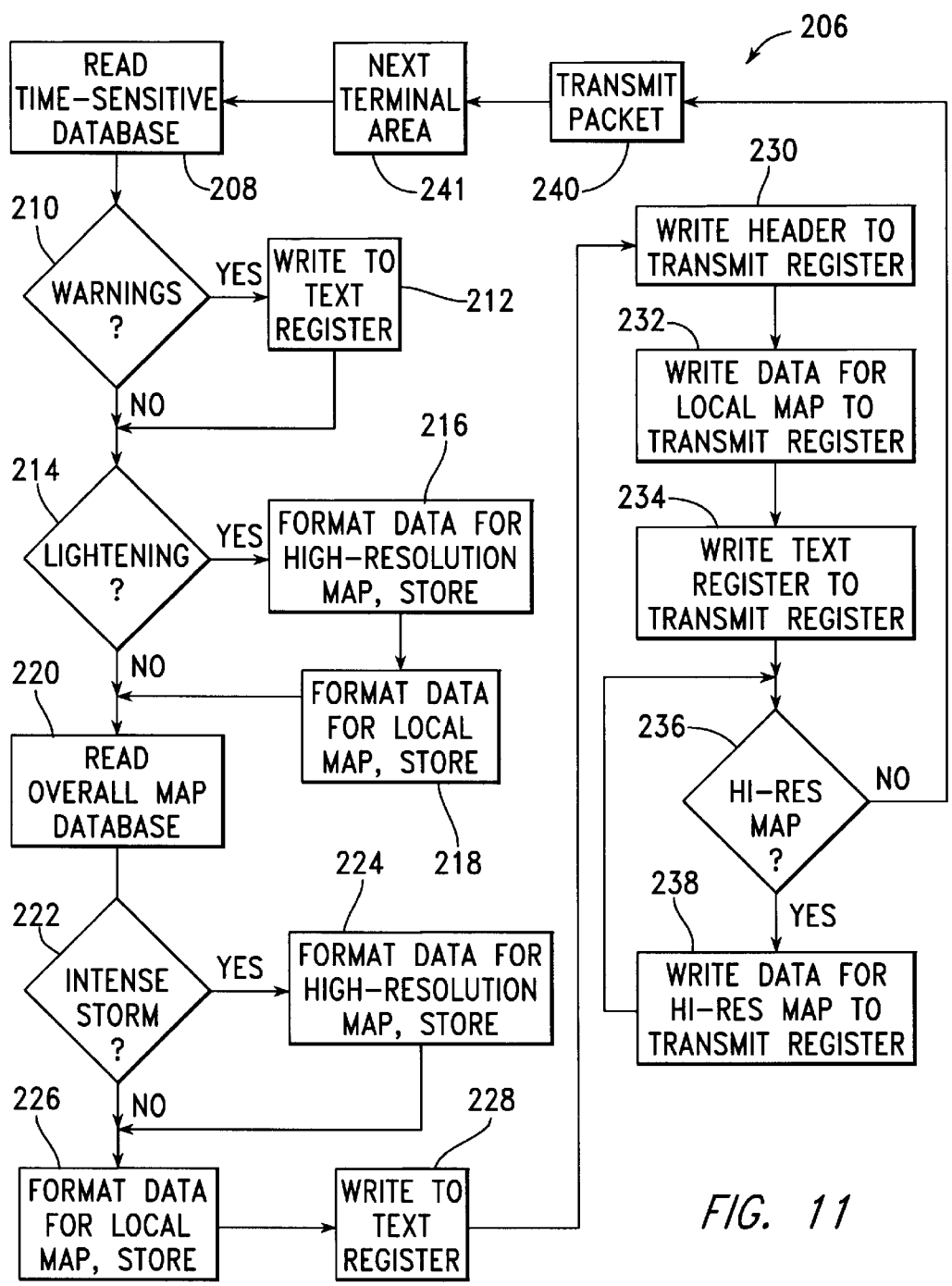
FIG. 11 is a flow chart of processes used to convert the contents stored in databases in the processes of data FIG. 9 into data packets for transmission.

The processes occurring within the computer 76 (shown in FIG. 7) in the data collection center 12 (shown in FIG. 1) will now be described, with particular reference being made to FIGS. 8–11. FIG. 8 is a flow chart indicating the process steps occurring initially to store weather data received by the computer 76 within the computer 76. FIG. 9 is a flow chart indicating the process steps occurring to convert the data stored by the process steps of FIG. 8 into the contents of several databases, which are subsequently read to form individual packets of weather information. FIG. 10 is a flow chart indicating the process steps occurring to erase time-sensitive data from a database when this data is no longer appropriately contained within new packets of weather information. FIG. 11 is a flow chart of process steps occurring as information is read from the databases to form a packet of weather information to be transmitted as data for a particular region.

Referring first to FIGS. 7 and 8, in step 128, a weather datum is received, to be written within an input buffer 106 in step 130. This weather datum may be, for example, a raster or bitmap graphical image constructed from observations at a particular weather radar installation, an air temperature measured at a particular location, or an indication from a particular ground sensor that a lightening strike has occurred. Since such events occur in a random, asynchronous manner, they are written to the input buffer as they are received.

FIG. 9 is a flowchart indicating the operation of a subroutine executing within the data collection center for processing the data available with the input buffer. Referring to FIGS. 7 and 9, this process begins with reading an encoded weather datum from the input buffer 106 in step 132. To be useful, this information must be associated with a particular location at which a measurement was made. Therefore, location coding is appended to the encoded description of the weather datum. An assumption is made that the datum as received in step 128 is somehow associated with a location indicating, for example, where the datum was measured. However, since the weather information comes, in general, from a number of different sources, it is further assumed that there is inconsistency among the ways this location data is encoded, so that a consistent method of coding is applied. Preferably, latitude and longitude parameters are used to form the basis of the method for specifying location.

In step 134, a header is appended to encoded data representing each weather datum, with a classification code within the header being set to indicate the type of data encoded. Each individual weather datum is encoded as a single location occurrence (SLO), a single location measurement with area applicability (SLM/AA), an area measurement with area applicability (AM/AA), or a text message with area applicability (TM/AA). A single location occurrence, such as a lightening strike, occurs at only one location. A single location measurement with area applicability, such as a temperature or humidity measurement, is measured at one location, such as the location of stationary instrumentation, but is applied as being valid for a larger area. An area measurement with area applicability is a measurement covering a relatively large area, which is thereby applicable thereto, such as a radar image or a satellite photograph of cloud cover. Next, in step 136, the classification code added in step 134 is read to determine the route to be taken by the subroutine executing in in further processing of the weather datum.

If the weather datum is determined in step 136 to be a single location occurrence (SLO), it is encoded in step 138 with a location having extreme precision, such as longitude 85 deg, 14 min, 21", latitude 40 deg N, 30 min 12 sec. The inclusion of seconds within the location may also be used to indicate priority in subsequent operations on the data. Expressing location parameters in this way provides for extreme accuracy, dividing the surface of the earth into squares having sides 30.92 m (101.45 ft) long at the equator, and into rectangles elsewhere, having sides 30.62 m (101.45 ft) long in a north-to-south direction, and, for example, at a latitude of 40 degrees, 20.62 m (67.66 ft) long in an east-to-west direction. While is reasonable to expect that the location of a lightening strike will not be established at this level of precision, a measured or calculated location for such an event is coded as having this level of precision so that the datum is handled with a predetermined level of priority in subsequent operations performed on the datum. From step 138, the subroutine progresses to step 140, in which the weather datum, including time and location codes, is written to the time-sensitive database 108. The time code is used to ensure that a symbol subsequently transmitted to show the lightening strike is turned off after a predetermined time has elapsed. For example, the time code may be the present time, plus a predetermined time describing the length of time through which the symbol is to be presented. In this way, if a number of lightening strikes occur with the movement of a storm, they are shown as a moving pattern of symbols on the screen of the user terminal 18, 22.

If the weather datum is determined in step 136 to be a single location measurement with area applicability (SLM/AA), its location code is added in step 142, not being located with this degree of precision, since such precision is not desired. For example, air temperature is measured at a particular location, but is considered to be applicable over a relatively wide area. Within such an area, actual significant variations in temperature are due to such factors as the shadows of structures or moving clouds, which cannot be reasonably considered even in a localized weather report. Thus, the location of a single location measurement with area applicability is preferably reported by latitude and longitude in terms of degrees and minutes, but not seconds. This method for expressing location parameters divides the surface of earth into squares having sides 1.855 km (1.153 mi) long at the equator, and into rectangles elsewhere, having sides 1.1855 km (1.153 mi) long in a north-to-south direction, and, for example, at a latitude of 40 degrees, 1.237 km (0.769 mi) long in an east-to-west direction. Next, the weather datum encoded in step 142, with a measurement of temperature or humidity being written to the temperature and humidity database 114 in step 144. Every time a new measurement of this type is written to the temperature and humidity database, like measurements, such as other temperature measurements, are interpolated in step 146 with the new measurement to obtain calculated measurements for locations among the points at which such measurements are made. When these calculations are complete, the interpolated data is written to the overall map database 110 in step 148.

When a weather datum is measured over an area, with applicability over the area (AM/AA), and with variations occurring in the datum over the area, the manner of coding location data depends on the weather conditions indicated by the datum. The best example of such data is a graphical pattern formed by weather radar. Since the boundary of an intense thunderstorm is critical both in terms of its location and in terms of its effect on public safety, the boundaries of severe weather are encoded with locations having longitude and latitude expressed in terms of degrees, minutes, and seconds. This type of encoding allows accurate high-resolution (large-scale) maps of the regions experiencing severe weather to be constructed. On the other hand, when no intense weather is included in a portion of a weather radar datum, within this portion, the seconds and even the minutes may be omitted from the description of latitude and longitude. When a location is expressed in terms of degrees, without minutes or seconds, the surface of the earth is divided into squares having sides 111.32 km (69.17 mi) long at the equator, and into rectangles elsewhere, having sides 111.32 km (69.17 mi) long in a north-to-south direction, and, for example, at a latitude of 40 degrees, 72.25 km (46.13 mi) long in an east-to-west direction.

Thus, when a weather datum is determined to be an AM/AA type in step 136, a further determination is made in step 152 of whether the weather datum is a weather radar output. If it is not a radar output, in the present example, it must be a cloud map, so the cloud map database 117 is updated in step 154. Since the cloud map extends across a general region, which is preferably identifiable through surface features shown in the photograph or through lines added to the photograph when such surface features are obscured by the cloud patterns, location encoding of the cloud map is not required. Each cloud map within the database 117 is overwritten by a subsequent cloud map in this process.

On the other hand, if the weather datum is a weather radar output, as determined in step 152, location codes are added to the datum in step 158. This process assigns a density level and a location code to each separate area to be stored within the individual weather radar database 112 associated with the weather radar installation providing the output. Within this step, individual areas of severe weather are isolated and associated with location codes having a higher resolution, permitting a higher level of precision, while large areas without changes may be expressed with location codes having a lower resolution. For example, large areas without precipitation are given location codes expressed in degrees of latitude and longitude, while areas with low or moderate levels of precipitation are given location codes expressed in degrees and minutes of latitude and longitude, and while areas including severe weather are given location codes expressed in degrees, minutes, and seconds. This type of encoding allows relatively small areas including severe weather to be displayed subsequently on high-resolution maps, while areas without changes are described using a relatively small number of location codes and associated reported densities. Next, in step 160, the weather data is written to the individual radar database 112 associated with the radar installation providing the data.

Figure 12:
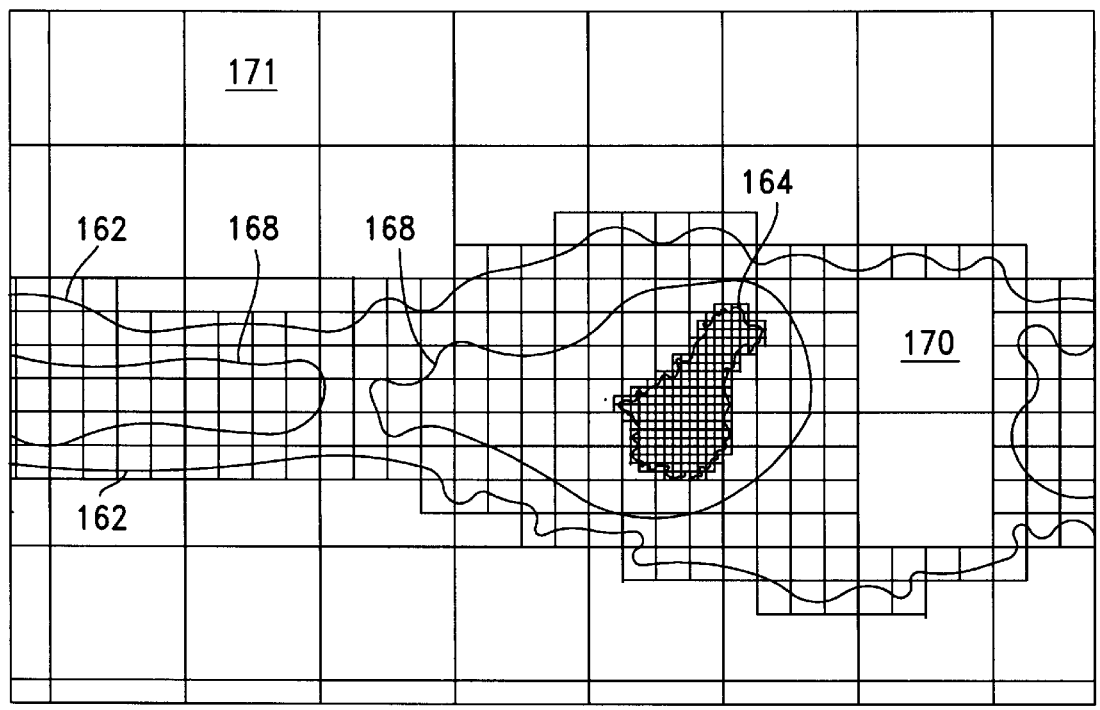
FIG. 12 is a pictorial plan view of a region of interest of a user terminal, divided into subregions at varying levels of resolution by the processes of FIG. 9.

FIG. 12 is a pictorial view showing an example of varying the resolution of data supplied to an individual weather radar database 112 as described above. In this example, precipitation occurs in an area bounded by lines 162. Within these lines 162, variations in levels of precipitation, which are represented by differences in the density of the areas or in differences in colors thereof, occur, with severe weather occurring in the area circumscribed by line 164. Thus, the areas within and immediately around this line 164 are divided in a manner providing a high level of resolution, in turn allowing the edges of this part of the storm to be shown accurately, together with any other features of storm activity occurring within the line 164.

Weather data, such as a precipitation index representing a level of precipitation, which is displayed as a particular density or color, is stored and transmitted as occurring at a specific geographical location. In accordance with a preferred version of the present invention, the size of the square subsequently assumed to have a constant level of weather is determined by the level of precision with which the geographical location is expressed, i.e. whether it is expressed in degrees and minutes or in degrees, minutes, and seconds, or the number of digits with which the geographical location is specified. In turn, the size of an individual square determines the distance between its center and the center of one or more adjacent square(s), and thereby the resolution at which data is stored and transmitted. A high resolution is achieved by a short center-to-center distance between adjacent geographical locations of data, while a low resolution accompanies a long center-to-center distance between adjacent geographical locations of data.

The remaining areas between the lines 162 are divided in a manner providing an intermediate level of resolution, with the edges of the area of precipitation being shown, and other features, such as changes in the level of precipitation indicated by lines 168 being shown at this intermediate level of resolution. Other areas, being as large as a pre-defined threshold area, such as areas 170, where variations in the level of precipitation are not indicated, and areas 171, where no precipitation is indicated, are shown at a much lower level of resolution.

Referring again to FIGS. 7 and 9, if a portion of the physical area covered by the data from the particular radar installation providing the data being stored overlaps with data provided by one or more other radar installations, the data within the overlap areas is averaged in step 172. Then, the data, including averaged data when necessary, is written to the overall map database in step 174.

Another type of weather datum is a textual warning issued, for example, by the National Weather Service. Such a warning is typically a safety warning with a high priority, such as a tornado warning or a flood watch. The boundaries of such a warning are typically given in terms of well-known lines of demarcation, such as county lines, highways, and rivers. When such a warning is received for location coding, its area is resolved into latitude and longitude coordinates, in terms of, for example, degrees and minutes. Seconds may be used as well, not because they are needed to define the boundary with sufficient precision, but because the use of seconds conveys a high level of priority. Alternatively, a level of priority may be conveyed through a separate characterization code appended to the weather datum in step 136.

Thus, after a determination is made in step 136 that the weather datum is a text message with area applicability (TM, AA), the text message is parsed by the system in step 176 to determine the locations affected and the time for which the warning is to remain in effect. Because there are so many ways to describe the boundaries of a threatened area, the system may be unable to parse the message. When this occurs, as determined in step 178, an alarm is operated in step 180, indicating that human intervention is needed. An operator then reads the message to determine the boundary being described and provides the needed input. In either case, the location codes and time codes indicating the end time given for the warning message are added to the weather datum in step 182. Then, the datum is written to the time-sensitive database 108 in step 184.

Continuing to refer to FIG. 7, and referring as well to FIG. 10, a subroutine 186 is used to erase the individual data stored within the time-sensitive database 108. This subroutine is executed on a periodic basis being begun by a timer pulse in step 188, which causes counters to be reset in step 190 to a beginning point from which all entries in the time-sensitive database 108 are read. An entry in this database 108 is next read in step 192, including an stored time for the erasure of this information. If this time has been reached or passed, as determined in step 194, the entry is erased in step 196. Otherwise, the entry is left within the database 108. In either case, a determination is made in step 198 of whether the entry under consideration is the last entry within the database 108. If it is, the subroutine 186 ends in step 200; otherwise, the next entry is selected in step 202, and the subroutine returns to step 192.

Referring to FIGS. 6, 7, and 11, a subroutine 206 executing in the computer 76 is used to generate a packet of information to be transmitted to each user terminal connected within the network 16 or 21 of FIG. 1 as a terminal within a particular terminal area 64. Each of the terminal areas 64 has associated therewith a surrounding area of interest 66, from within which weather data is reported.

For a terminal area 64, the subroutine 206 begins with step 208, in which the time-sensitive database 108 is read to determine if there are any warning messages or lightening strikes associated with the area of interest 66 in turn associated with the terminal area 64. If there is such a warning message, as determined in step 210, the warning message is written in step 212 to the text register 118 in which text is assembled for the packet of information to be transmitted. Next, if there is a lightening strike within the area of interest 66, as determined within step 214, the lightening-strike data for a high-resolution map in the area of the lightening strike and stored in a high-resolution database 116 in step 216. Next, the lightening strike data is formatted to be displayed as well in the local map to be transmitted and stored in the local map register 119 in step 218.

Next, the overall map database 110 is read in step 220 to determine the data associated with the area of interest 66 in turn associated with the terminal area 64. If an intense storm is indicated by this data in step 222, the data including and surrounding the storm is formatted as required for a high-resolution map and stored in high-resolution map database 116 in step 224. If there are two or more substantially-separated severe storm areas within the area of interest 66, two or more high-resolution maps are stored in two or more databases 116, so that each area of severe storm is presented on a high-resolution map. Next, whether or not an intense storm has been detected in step 222, the subroutine proceeds to step 226, in which radar precipitation data is formatted as variation in densities and/or color for presentation on a local map covering the area of interest 66, and in which such data is stored in the local map register 119, together with the lightening strike data, if any, previously stored in step 218. Following step 226, in step 228, data such as temperature and humidity information associated with the terminal area 64 is written to the text register.

Formatting radar precipitation data for high-resolution maps, particularly to show the edges of a severe storm system in an accurate manner, is made possible by the recording of location codes in a high-resolution manner in step 158 (shown in FIG. 9), and by thereby showing radar precipitation data within and immediately around areas of severe weather at a high resolution, as discussed above in reference to FIG. 12. In accordance with the nature of lightening and precipitation, lightening strike data is often presented on a high-resolution map along with severe weather data derived from weather radar information. If lightening occurs in an absence of other forms of severe weather, the lightening data is presented on a high-resolution map with precipitation data from weather radar remaining at a low resolution. In such an event, only the precise location of the lightening strikes is significant.

Following step 228, the process of writing an individual data packet for transmission is begun in step 230 with writing header information to the transmit register 120. This header information includes a code identifying the terminal region 64 for which the data packet is intended, with this code possibly being expressed in the form of a number, as described above in reference to FIG. 5. Next, in step 232, the data from the local map register 119 is written to the transmit register 120, and, in step 234, text data from the text register 118 is written to the transmit register 120.

At this point, there may be one or more high-resolution maps stored in high-resolution databases 116 or, if there are neither lightening strikes nor other forms of severe weather within the area of interest 68, there are no such high-resolution maps stored. Thus, in step 236, a determination is made of whether a high-resolution map is stored in a high-resolution database 116 If there is such data, it is written to the transmit register 120 in step 238. The subroutine then returns to step 236 to determine if there is another high-resolution map stored in another high-resolution database 116. This process continues until data from each such high-resolution map has been written to the transmit register 238. When there is no such high-resolution map left, or if there is no initial such map, in each case as determined in step 236, the packet of information is transmitted from the computer system 76 to the network 16, 21 (shown in FIG. 1) in step 240.

Next, in step 241, the subroutine selects the next terminal area 64 in step 241 to repeat the process described above, starting with step 208. When the system is initialized, the initial terminal area is chosen in this way.

Figure 13:
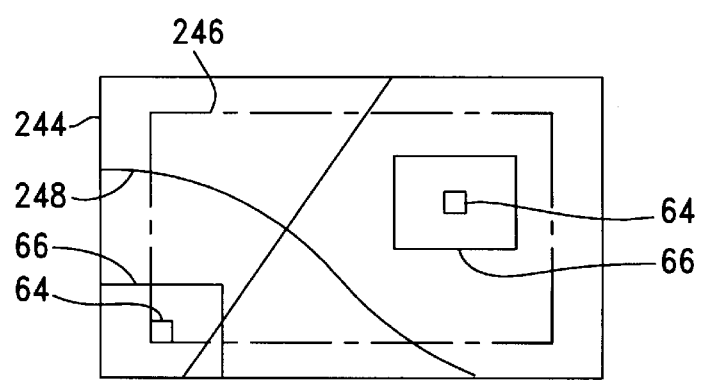
FIG. 13 is a pictorial plan view of the area from which weather data is stored within an overall map database during the processes of FIG. 9.

FIG. 13 is a pictorial plan view of the area 244 from which data is stored within the overall map database 110. A line 246 indicates the area throughout which service is provided using the computing system 76. Within this area 244, there are a number of terminal regions 64. For each terminal region 64, in which a plurality of user terminals may be connected, there is a surrounding area of interest 66. The area 244 from which data is stored is larger than the area indicated by line 246, in which service is provided, so that weather information is derived for each of the areas of interest 66 surrounding terminal regions 64 lying along the periphery of the area indicated by line 246.

The data stored in the overall map database 110 also includes lines 248 describing physical features, such as roads, rivers, and towns. This data is used to produce maps in which the user can easily relate weather patterns to geography. In a process of initialization of the computing system 76, these lines 248, with associated descriptive legends, is loaded into the overall map database 110 from a file, for example in a hardfile, and a pre-defined first terminal area is defined as the next terminal area in step 240 of FIG. 11.

Figure 14:
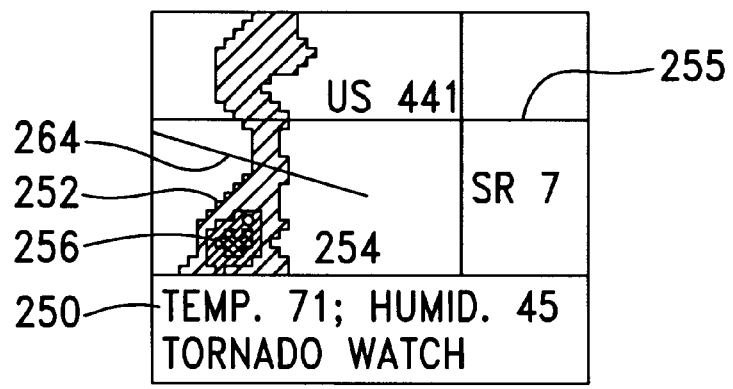
FIG. 14 is a display screen generated from a data packet of FIG. 10 to form a local map.
Figure 15:
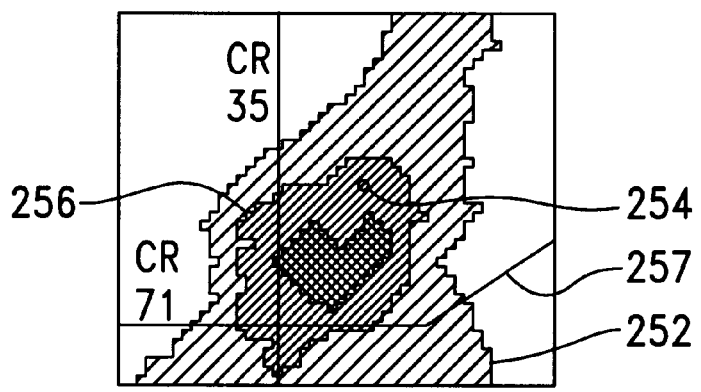
FIG. 15 is a display screen generated from the data packet of FIG. 10 to form a high-resolution map.
Figure 16:
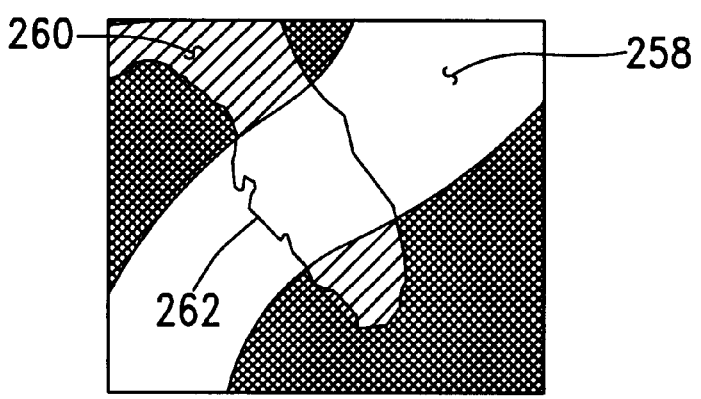
FIG. 16 is a display screen generated from the data packet of FIG. 10 to form a cloud map.

FIGS. 14–16 are examples of maps displayed in an alternating fashion on a user terminal 18, 22 of FIG. 1. FIG. 14 is a local map covering the entire area of interest 66 of the user terminal, including as well text information describing temperature and humidity, as well as warning messages, if any. The map includes a shaded or colored pattern 252 of data derived from weather radar to indicate clouds and precipitation, along with lightening strike symbols 254 as required. The map also includes indications 255 describing physical features, such as roads, to which the weather patterns may be located. FIG. 15 is a high resolution map generated because of an indication 256 of severe weather or because of an indication 254 of a lightening strike within the area of interest 66 of the user terminal. Also included are indications 257 of physical land features, which may be present on a high resolution but absent on the local map of FIG. 14. FIG. 16 is a satellite photograph of cloud formations over a region including the area, indicated by line 246 in FIG. 13, through which coverage is provided. This photograph includes cloud formations, 258, land formations 260, and lines 262 drawn to describe coastlines and political boundaries even under cloud cover.

Referring again to FIG. 1, the hardwire distributor 14 formats the data arriving in packets transmitted from the data collection center 12 as required for transmission over a hardwire network. In the case of the Internet network 16, this weather information may be sent in the form of web pages, with the user being able to select among the various maps available from the data collection center 12. In the case of a cable television network 27, equipment is presently available for converting an image displayed by a computer into a standard raster scan image for transmission on a cable network. Equipment of this type, which is now widely used by cable television systems for assembling and displaying programs of classified advertisements, can be made a part of the hardwire distributor 14, so that packets of information converted as required for display on a computer can in turn be converted into raster scan images.

Similarly, the broadcast transmitter and encoder 19 formats the data arriving in packets transmitted from the data collection center 12 as required for transmission over a broadcast network 19. For example, the data may be sent in the form of web pages over the cellular telephone network, with the receivers 23 being cellular telephone units connected to computer terminals. Alternately, the receivers 23 may be specialized devices receiving information over a specialized broadcast network.

The preceding discussion has described the assembly and transmission of stationary images. It an alternate version of the present invention, moving images of weather maps are produced and transmitted, in accordance with the methods described above. Moving images are now produced and transmitted over the Internet, particularly with compressions techniques, such as those defined by MPEG (Motion Picture Experts Group). Such techniques are readily applied within the present invention. For example, a rotating line 264 may be added to the local map of FIG. 14, with the weather pattern 252 appearing to be refreshed by the passage of the rotating line 264. Following the passage of the rotating line 264, the weather pattern 252 gradually fades as its contrast is reduced. As the line 264 passes, the contrast of the weather pattern 252 is increased, indicating that it has been refreshed. This line 264 preferably radiates from the center of the terminal region 64, so that the user is provided with the familiar pattern derived from a weather radarscope, with a virtual radar unit being placed essentially at his location. This type of graphical manipulation may be applied either at the data collection center 12, or at the hardware distributor 14 and the broadcast transmitter and encoder 19. Audio clips describing the weather may be included with the information forming map data, as well.

In another alternate version of the present invention, a higher level of resolution may be used to present temperature data, with the resolution being responsive, for example, to the rate at which temperature changes with respect to distance. This type of information is particularly critical in reporting frost conditions in agricultural areas. The level of resolution for temperature data may differ between the directions in which location coordinates are given. For example, near a coastline, a temperature reading may be valid for 48 km (30 miles) in a direction parallel to the coast, but only for 9.6 km (6 miles) in a direction perpendicular to the coast, due to temperature changes resulting from the moderating effect of the ocean.

Referring again to FIGS. 1, 5 and 6, in another alternate version of the present invention, weather information is developed both for areas 62 having a fine resolution and for areas 60 having a coarse resolution. The user terminal 18, 22 is provided with a capability to choose either the fine resolution of an area 62 or the coarse resolution of an area 60, with this capability being provided, for example, by making a selection on an Internet web page, or be changing a channel viewed over a cable television system 26, 36, 48 (shown in FIGS. 2, 3, and 4) or a broadcast network 21. Each area 62 of fine resolution preferably has associated therewith a smaller area of interest 66 than the area 60 of coarse resolution, so that the user can choose between better resolution and a larger area from which data is presented.

While the invention has been described in its preferred forms or embodiments with some degree of particularity, it is understood that this description has been given only by way of example, and that numerous changes in the details of construction, fabrication, and use, including the combination and arrangement of process steps, may be made without departing from the spirit and scope of the invention.

What is claimed is:

1. A method for transmitting location-specific weather-related data to terminals within a plurality of terminal regions, wherein said method comprises steps of:

a) receiving input weather information;

b) storing said input weather information in a buffer;

c) storing said input weather information in a database, wherein each portion of said weather information is addressable according to a geographical location associated with said portion of said weather information;

d) reading from said database each portion of said weather information associated with a geographical location within an area of interest surrounding a terminal region and associated with said terminal region;

e) writing a data packet for transmission to terminals within said terminal region wherein said data packet includes header information identifying said terminal region and said weather information associated with said geographical location within said area of interest surrounding said terminal region and associated with said terminal region f) transmitting said data packet to terminals within said terminal region;

g) repeating steps d), e), and f) for another terminal region within said plurality of terminal regions until a data packet for transmission to terminal within each said terminal region has been transmitted to each terminal region within said plurality of terminal regions.

2. The method of claim 1, wherein each said terminal region is centrally disposed within said area of interest surrounding said terminal region and associated with said terminal region.

3. The method of claim 1, wherein each said portion of said weather information includes a precipitation index describing a level of precipitation occurring at said geographical location associated with said portion of said weather information, and wherein each said precipitation index is derived from data supplied by a weather radar installation.

4. The method of claim 3, wherein said portions of said weather information associated with a geographical location within an area of interest surrounding a terminal region and associated with said terminal region are combined into a format allowing transmission of motion sequences before transmission, and before transmission, a rotating line extending from, and rotating about, a location corresponding to a center of said terminal region is added to a graphical image of said weather information superimposed on a map of said area of interest, with elements of said graphical image gradually fading with reduced contrast and being refreshed with increased contrast following passage of said rotating line.

5. The method of claim 3, wherein said portions of said weather information are stored in said database according to adjacent geographical locations separated from one another in accordance with levels of said precipitation index associated with said geographical locations.

6. The method of claim 5, wherein portions of said input weather information associated with geographical locations in an area larger than a threshold size having no changes in levels of said precipitation index are stored in said database according to adjacent geographical locations separated from one another by a first distance, portions of said input weather information associated with geographical locations in an area having changes in levels of said precipitation index are stored in said database according to adjacent geographical locations separated from one another by a second distance, and said second distance is substantially less than said first distance.

7. The method of claim 5, wherein portions of said input weather information associated with geographical locations in an area larger than a threshold size having no changes in levels of said precipitation index are stored in said database according to adjacent geographical locations separated from one another by a first distance, portions of said input weather information associated with geographical locations in an area having changes in levels of said precipitation index with each precipitation index within said area indicating an absence of severe weather are stored in said database according to adjacent geographical locations separated from one another by a second distance, portions of said input weather information associated with geographical locations in an area having changes in levels of said precipitation index with a precipitation index within said area indicating a presence of severe weather are stored in said database according to adjacent geographical locations separated from one another by a third distance, said second distance is substantially less than said first distance, and said third distance is substantially less than said second distance.

8. The method of claim 5, wherein portions of said input weather information associated with geographical locations in an area with a precipitation index, indicating a presence of severe weather within said area, are stored in said database at a high resolution according to adjacent geographical locations separated from one another by a first distance, other portions of said weather information are stored in said database according to geographical locations separated from one another by a second distance, and said first distance is substantially greater than said second distance.

9. The method of claim 5, wherein distances between adjacent geographical locations are indicated by levels of precision with which said geographical locations are saved.

10. The method of claim 7, additionally comprising steps of:

following step d), determining if weather information associated with geographical locations within said area of interest includes weather information stored in said database at said high resolution, and following step e), when it has been determined that weather information associated with geographical locations within said area of interest includes weather information stored in said database at said high resolution, transmitting data, at said high resolution, for a region including said weather information stored in said database at said high resolution.

11. A method for transmitting location-specific weather-related data to terminals within a plurality of terminal regions, wherein said method comprises steps of:

a) receiving said input weather information;

b) storing said input weather information in a buffer;

c) determining whether said input weather information is in a first or second class, wherein input weather information in said first class is stored to be overwritten by subsequent weather information, and wherein weather information in said second class is stored to be erased at a specified time;

d) storing said input weather information in said first class in an overall database, wherein each portion of said input weather information in said first class is addressable according to a geographical location associated with said portion of said weather information;

e) storing said input weather information in said second class in a time-sensitive database, wherein each portion of said weather information in said second class is addressable according to a geographical location associated with said portion of said weather information, and wherein each portion of said weather information in said second class is stored with an indication of a time when said weather information is to be erased;

f) for weather information stored in said time-sensitive database, checking said indication of said time when said weather information is to be erased, and erasing said weather information if said time has past, g) reading from said overall database each portion of said weather information of said first class associated with a geographical location within an area of interest surrounding a terminal region and associated with said terminal region;

h) reading from said time-sensitive database each portion of said weather information of said second class associated with a geographical location within an area of interest surrounding said terminal region and associated with said terminal region;

i) formatting weather information read in steps g) and h) to superimpose information read in step h) over information read in step g)

j) transmitting weather information formatted in step i) to terminals within said terminal region; and k) repeating steps g) through j) for another terminal region within said plurality of terminal regions until portion of said weather information have been transmitted to each terminal region within said plurality of terminal regions.

12. The method of claim 11, wherein step c) includes determining if said input weather information includes data representing an occurrence of a lightening strike at a specific geographical location; and if a determination is made in step (c) that said input weather information includes said data representing an occurrence of a lightening strike, step e) includes storing a lightening code representing a lightening strike, together with a time code representing when a displayed symbol for said lightening strike is to be erased, in said time-sensitive database, wherein said lightening code is addressable according to said specific geographical location.

13. The method of claim 12, wherein step d) includes storing a precipitation index describing a level of precipitation occurring at said geographical location, said precipitation index is derived from data supplied by a weather radar installation, and in step i), encoded information representing a lightening strike is superimposed over a map of precipitation indexes in a position indicating said specific geographical location of said lightening strike.

14. The method of claim 13, wherein said precipitation indexes are stored in said database according to adjacent geographical locations separated from one another in accordance with levels of said precipitation index associated with said geographical locations.

15. The method of claim 14, wherein precipitation indexes associated with geographical locations in an area larger than a threshold size having no changes in levels of said precipitation index are stored in said database at a low resolution according to adjacent geographical locations separated from one another by a first distance, precipitation indexes associated with geographical locations in an area having changes in levels of said precipitation index with each precipitation index within said area indicating an absence of severe weather are stored in said database at an intermediate resolution according to adjacent geographical locations separated from one another by a second distance, precipitation indexes associated with geographical locations in an area having changes in levels of said precipitation index with a precipitation index within said area indicating a presence of severe weather are stored in said database at a high resolution according to adjacent geographical locations separated from one another by a third distance, said second distance is substantially less than said first distance, and said third distance is substantially less than said second distance.

16. The method of claim 15, additionally comprising steps of:

l) following step g), determining if weather information associated with geographical locations within said area of interest includes precipitation indexes stored in said database at said high resolution; and c) following step j), when it has been determined that weather information associated with geographical locations within said area of interest includes precipitation indexes stored in said database at said high resolution, transmitting data, at said high resolution, for a region including said weather information stored in said database at said high resolution to terminals within said terminal region.

17. The method of claim 15, additionally comprising steps of:

l) following step g), determining if weather information associated with geographical locations within said area of interest includes precipitation indexes stored in said database at said high resolution;

n) following step i), when it has been determined that weather information associated with geographical locations within said area of interest includes precipitation indexes stored in said overall database at said high resolution, formatting data at said high resolution for a for a particular region including said weather information stored in said database at said high resolution, together with superimposed data from said time sensitive database occurring at geographical locations within said particular region; and o) following step j), if data has been formatted in step n), transmitting said data formatted in step n) to terminals within said terminal region.

18. The method of claim 17, additionally comprising steps of:

p) following step l), determining if a lightening code stored in said time-sensitive database is addressable according to a specific geographical location within said area of interest but outside a region including precipitation indexes stored in said database at high resolution;

q) following step n), if it has been determined that a lightening code stored in said time-sensitive database is addressable according to a specific geographical location within said area of interest but outside a region including precipitation indexes stored in said database at high resolution, formatting weather data from said overall database, stored in accordance with geographical locations in a first region surrounding said specific geographical location, with a symbol representing a lightening strike superimposed in a location corresponding to said specific geographical location over said weather data from said overall database stored ion accordance with geographical locations in said first region; and r) following step j), if data has been formatted in step q), transmitting said data formatted in step q) to terminals within said terminal region.

19. The method of claim 11 wherein step c) additionally includes determining if said input weather information includes a text message, and if said input weather information includes a text message, parsing said text message to determine a geographical area to which said text message applies and a time at which said text message is to be erased, and in step e), if said weather information is determined to include a text message in step c), storing said text message in said time-sensitive database along with a time code indicating said time at which text message is to be erased, wherein said text message is addressable according to geographical locations within said geographical area to which said text message applies.

20. The method of claim 11 wherein step c) additionally includes determining if said input weather information includes a temperature measurement made at a specific location, and said method additionally comprises, between steps c) and d), steps of, if a determination is made in step c) that said input weather information includes said temperature measurement, storing said temperature measurement in a temperature and humidity database, interpolating said temperature measurement with other temperature measurements stored in said temperature and humidity database to form a plurality of calculated temperatures addressable at a plurality of geographical locations, and providing said plurality of calculated temperatures as input data in said first class to be stored in step d) in said database, being addressable according to said plurality of geographical locations, and step i) additionally includes formatting a temperature read in step g) to be superimposed over other weather information read in step g).

21. The method of claim 20, wherein step c) additionally includes determining if said input weather information includes a humidity measurement made at a specific location, said method additionally comprises, between steps c) and d), steps of, if a determination is made in step c) that said input weather information includes said humidity measurement, storing said humidity measurement in a temperature and humidity database, interpolating said humidity measurement with other humidity measurements stored in said temperature and humidity database to form a plurality of calculated humidity values addressable at a plurality of geographical locations, and providing said plurality of calculated humidity values as input data in said first class to be stored in step d) in said database, being addressable according to said plurality of geographical locations, and step i) additionally includes formatting a humidity value read in step g) to be superimposed over other weather information read in step g).

22. The method of claim 11, wherein step c) additionally includes determining if said input weather information includes a satellite photograph of cloud patterns, and said method additionally comprises, between steps a step c) and d), a step of, if a determination is made in step c) that said input weather information includes a satellite photograph of cloud patterns, storing said satellite photograph in a cloud map database.

23. The method of claim 11, wherein, in step j), said weather information is transmitted to said terminals over the Internet.

24. The method of claim 11, wherein, in step j), said weather information is transmitted to said terminals over a cable television system with said terminal region being established by an individual cable television channel.

25. The method of claim 11, wherein, in step j), said weather information is transmitted to said terminals over a cable television system with transmission to various terminal regions occurring over various differing portions of said cable television system.

26. The method of claim 11, wherein, in step j), said weather information is transmitted over a broadcast network with transmission to each said terminal region being assigned to a transmission channel, and said method additionally includes steps of receiving said broadcast information over a receiver switchable to receive information over various of said transmission channels, and of transmitting information from said receiver to said terminal.

27. The method of claim 11, wherein, in step j), said weather information is transmitted over a broadcast network with transmission to each said terminal region being assigned to a transmission channel, and said method additionally includes steps of receiving said broadcast information over a receiver receiving information over a transmission channel selected in accordance with a geographical location of said receiver as determined by a navigational system, and of transmitting information from said receiver to said terminal.

* * * * *